(12) United States Patent
Halpin

(10) Patent No.: US 6,360,148 B1
(45) Date of Patent: Mar. 19, 2002

(54) METHOD AND APPARATUS FOR CONTROLLING HYDRAULIC DAMPERS

(76) Inventor: Michael W. Halpin, 3435 Desert Trumpet Rd., Phoenix, AZ (US) 85044

( * ) Notice: Subject to any disclaimer, the term of this patent is extended or adjusted under 35 U.S.C. 154(b) by 0 days.

(21) Appl. No.: 09/440,738

(22) Filed: Nov. 16, 1999

(51) Int. Cl.$^7$ .......................... B60G 23/00; B60G 25/00

(52) U.S. Cl. ......................................... 701/37; 280/5.5

(58) Field of Search ....................... 701/37, 38; 280/5.5

(56) References Cited

U.S. PATENT DOCUMENTS

| | | | |
|---|---|---|---|
| 4,371,191 A | * 2/1983 | Goldberg et al. | ........... 280/707 |
| 5,682,968 A | 11/1997 | Boichot et al. | |
| 5,937,975 A | 8/1999 | Forster | |
| 6,085,632 A | * 7/2000 | Stoll et al. | ........... 91/361 |
| 6,116,648 A | * 9/2000 | Holly et al. | ........... 280/777 |

OTHER PUBLICATIONS

Jacques Gordon, Understanding Electronic Suspension Systems, Motor Age Online, Feb. 1999, published on internet at http://www.motorage.com/edindex/0299020.htm.

* cited by examiner

Primary Examiner—Yonel Beaulieu
(74) Attorney, Agent, or Firm—Mark William McGarry

(57) ABSTRACT

Among other things, methods and apparatus for automatically controlling hydraulic dampers are described. The apparatus can automatically sense the magnitude of at least one electrical input signal, automatically process each input signal through a microprocessor and associated software algorithm to determine an optimum damping rate, and automatically generate an electrical output signal corresponding to the optimum damping rate. The output signal is configured for communication with a hydraulic damper having means for automatically controlling the damping rate according to an electrical signal. Electrical input signals correspond to variables including engine speed, wheel speed, throttle position, vehicle operator position, and suspension position.

5 Claims, 4 Drawing Sheets

| LOGICAL STATE | ENGINE SPEED | WHEEL SPEED | THROTTLE POSITION | DRIVER POSITION | SUSPENSION POSITION | OPTIMUM DAMPING RATE |
|---|---|---|---|---|---|---|
| 1 | LOW | LOW | LOW | SEATED | NOT EXTENDED | LOW |
| 2 | LOW | LOW | LOW | NOT SEATED | NOT EXTENDED | HIGH |
| 3 | HIGH | LOW | LOW | SEATED | NOT EXTENDED | LOW |
| 4 | HIGH | LOW | HIGH | SEATED | NOT EXTENDED | LOW |
| 5 | HIGH | LOW | HIGH | NOT SEATED | NOT EXTENDED | HIGH |
| 6 | HIGH | HIGH | LOW | SEATED | NOT EXTENDED | LOW |
| 7 | HIGH | HIGH | LOW | NOT SEATED | NOT EXTENDED | HIGH |
| 8 | HIGH/LOW | HIGH/LOW | HIGH/LOW | SEATED/NOT SEATED | EXTENDED | HIGH |

FIG. 4

METHOD AND APPARATUS FOR CONTROLLING HYDRAULIC DAMPERS

BACKGROUND OF THE INVENTION

1. Field of the Invention

The present field of invention relates to motor vehicle suspension systems.

More specifically, this invention relates to hydraulic damping of all-terrain motor vehicle suspension systems.

In a further and more specific aspect, this invention relates to methods and apparatus for automatically controlling hydraulic dampers in all-terrain motor vehicles suspension systems.

2. The Prior Art

Conventional suspension systems for motor vehicles enhance ride comfort and operating safety by controlling oscillations in a direction substantially normal to the riding surface. These systems substantially comprise a system of springs, dampers, and sensors that are automatically controlled by a computer. These types of suspension systems are commonly referred to as "active" or "semi-active" and are employed for use in automobiles manufactured by companies including Toyota, Mercedes-Benz, and Ferrari. Jacques Gordon, Technical Editor for Motor Age describes the state of the art in automobile suspension systems in his February 1999 article, hereby incorporated by reference, "Understanding Electronic Suspension Systems". A great need exists for the transfer of this technology into the all-terrain vehicle market.

Conventional all-terrain motor vehicles are frequently used in recreational sporting activities and can be divided into those having two wheels, commonly known as motorcycles, and those having four wheels, commonly known as quads, sand rails and 4-wheel drive trucks. Track-driven vehicles commonly known as snowmobiles are also frequently used in recreational sporting activities.

All-terrain motor vehicles typically employ suspension systems including springs and hydraulic damping devices, commonly known as shock absorbers. The springs supports the mass of a vehicle operator and the mass of the vehicle chassis, the combination of which is commonly know as a sprung mass. Springs used in conjunction with shock absorbers in conventional suspension systems attempt to isolate the sprung mass of the vehicle from an uneven riding surface, resulting in a smoothened ride. The topography of the typical riding surface can be extreme, ranging from smooth stretches to large jumps. The physical composition of the typical riding surface can also be extreme and includes dirt, rocks, and mud.

Typical shock absorbers include a piston, a damping valve assembly, a connecting rod, a cylinder, hydraulic fluid, and an accumulator. The connecting rod is rigidly attached concentrically to one side of the piston and both translate back and forth inside the cylinder, which is filled with a substantially incompressible hydraulic fluid. The retracting motion, where the free end of the connecting rod and the free end of the cylinder move toward each other, is commonly known as compression. The extension motion, where the free end of the connecting rod and the free end of the cylinder move apart from each other, is commonly known as rebound. As the piston moves relative to the cylinder, hydraulic fluid is forced through the damping valve assembly attached to the piston, imparting a viscous damping force onto the piston and connecting rod. The accumulator compensates for the imbalance in hydraulic fluid volume on either side of the piston created by the presence of a connecting rod. Hydraulic fluid flows into and out of the accumulator during compression and rebound, respectively. Many conventional shock absorbers allow for the independent control of hydraulic fluid flow rate into and out of the accumulator with manually adjustable valves. Since the hydraulic fluid is substantially incompressible, the rate at which it flows into and out of the accumulator directly effects the damping rate.

The prior art proposes various shock absorbers that include a means for automatically controlling damping rates. U.S. Pat. No. 5,850,896 to Tanaka describes an electrically operated shock absorber that includes a pilot chamber and pilot valve which pilot valve is acted on by an electrical solenoid so as to control the damping characteristics of the shock absorber. An arrangement is provided for preventing total bumping of pressure in the pilot chamber in the event of electrical failure and substituting a pressure responsive valve for controlling the damping characteristics when the electrical failure occurs. Unfortunately, existing control systems employed to generate the electrical signals for such a shock absorber do not actively respond to conditions as described by the present invention. For example, U.S. Pat. No. 5,682,968 to Boichot, et al., describes a semi-active suspension system with control circuit having a direct control loop including an inverse model of the damper. The control system described by Boichot does not address variables including engine speed, wheel speed, throttle position, vehicle operator position, and suspension position.

Dynamic response of a hydraulic damper is substantially a function of compression damping rate, rebound damping rate, sprung mass, and spring rate. Damping rates are a function of the rate at which hydraulic fluid flows through the damping valve, and the rate a which hydraulic fluid flows into and out of the accumulator. These flow rates are a function of hydraulic fluid viscosity, hydraulic fluid compressibility, damping valve configuration, and accumulator valve setting. Hydraulic fluid viscosity is a function of hydraulic fluid temperature, which invariably increases during operation in extreme conditions. Unfortunately, an increase in hydraulic fluid temperature typically attenuates damping rates.

The process of optimizing the dynamic response of a hydraulic damper is typically executed manually by the vehicle operator. The optimization process typically requires iteration to obtain acceptable results. The vehicle operator typically adjusts compression and rebound damping rate settings manually with a screwdriver while the vehicle is stopped. Once set, the damping rate cannot easily be changed during operation. Even if the adjustment means were located conveniently, it would be extremely difficult to make manual modifications while operating the vehicle. In the case of optimization immediately prior to an all-terrain motorcycle race, the vehicle operator will typically traverse the racecourse to access and optimize the handling performance of the vehicle over typically extreme conditions of the riding surface. Unfortunately, racing surface conditions can change rapidly and drastically not only during a race, but also during the iterative performance optimization process itself The damping rate settings determined prior to a race may therefore not be the desired settings soon after a race starts, and could result in the creation of adverse conditions for the vehicle operator.

Damping response to high-impact compression on landing from large jumps where the vehicle becomes airborne is usually accessed. All-terrain motorcycles can successfully land on a dirt ramp surface from heights exceeding 25 feet.

The desired damping for high-impact compression is high enough to avoid a condition known as bottoming. Bottoming occurs during a high-impact compression when the suspension reaches the limit of its travel and transmits an extreme and undesirable jarring force through the vehicle to the vehicle operator.

Damping response to low-impact compression while traversing the vehicle over acceleration bumps is also usually accessed. Acceleration bumps form inside and at the exit of turns from repeated acceleration of many vehicles through the turns, are spaced approximately 0.5 to 1.0 meters apart peak to peak, and are approximately 10 to 20 centimeters deep. The desired damping for low-impact compression is low enough to avoid a condition known as chassis upset. Chassis upset occurs during low-impact compression when the suspension transmits enough force to the chassis to exceed the ability for the suspension to stay in contact with the riding surface. For example, chassis upset may occur while operating an all-terrain motorcycle. As the vehicle operator attempts to accelerate out of a turn containing acceleration bumps, the suspension may respond in a non-compliant manner and allow the rear tire to temporarily lose contact with the riding surface. If this condition persists, it may cause an undesirable loss in traction, acceleration, and control.

Unfortunately, limitations of conventional suspension damping systems compromise performance when trying to span the full range of extreme riding surface conditions possible. The vehicle operator must make a conscious decision to compromise between compression damping rates. If the compression damping rate is set high enough to avoid bottoming during landing from large jumps, it may induce chassis upset while traversing acceleration bumps. If the compression damping rate is set low enough to avoid chassis upset while traversing acceleration bumps, it may induce bottoming upon landing from large jumps.

The limitations of conventional suspension systems stems from the inability to automatically respond to conditions that could indicate the magnitude of damping required. These variables include engine speed, wheel speed, throttle position, vehicle operator position, vehicle operator mass, suspension position, suspension speed, and hydraulic fluid temperature.

Vehicle operator position has a drastic impact on overall damping performance of all-terrain motorcycles and quads. When in a sitting position on an all-terrain motorcycle or quad, the vehicle operator's entire body is directly coupled to the vehicle chassis. When standing on the foot pegs of the vehicle, the vehicle operator's knee joints and legs act as a secondary suspension system. This condition de-couples the vehicle operator's upper body from the vehicle chassis. The compression and rebound damping requirements are less for the de-coupled condition than for the directly coupled condition. Unfortunately, conventional damping systems cannot automatically compensate for varying vehicle operator position.

Sprung mass also has a drastic impact on overall damping performance of all-terrain motorcycles and quads because vehicle operator mass is substantial relative to vehicle mass. Unfortunately, conventional damping systems cannot automatically compensate for varying vehicle operator mass. This becomes important in the rental market where vehicle operators of different mass operate the vehicle on a daily basis.

It would be highly advantageous, therefore, to remedy the foregoing and other deficiencies inherent to the prior art.

Accordingly, a general object of the present invention is to provide a method and apparatus for advancing all-terrain motor vehicle damping system performance beyond that which any prior art provides. Still further objects and advantages of the present invention will become apparent upon consideration of the drawings and ensuing descriptions.

SUMMARY OF THE INVENTION

In order to achieve the objects and advantages of the present invention, first provided is a control system for a hydraulic damper. The control system comprises a means for automatically sensing the magnitude of at least one electrical input signal, a means for automatically processing each input signal through a microprocessor and associated software algorithm to determine an optimum damping rate, and a means for automatically generating an electrical output signal corresponding to the optimum damping rate. The output signal is configured for communication with a hydraulic damper having means for automatically controlling the damping rate according to an electrical signal. Electrical input signals correspond to variables including engine speed, wheel speed, throttle position, vehicle operator position, and suspension position.

Also provided is a method for automatically controlling a hydraulic damper. The method comprises a first step of automatically sensing the magnitude of at least one electrical input signal, a second step of automatically processing each input signal through a microprocessor software algorithm to determine an optimum damping rate, and a third step of automatically generating an electrical output signal corresponding to the optimum damping rate. The output signal is configured for communication with a hydraulic damper having means for automatically controlling the damping rate according to an electrical signal. Electrical input signals correspond to variables including engine speed, wheel speed, throttle position, vehicle operator position, and suspension position.

BRIEF DESCRIPTION OF THE DRAWINGS

The foregoing, and further and more specific advantages of the present invention will become readily apparent to those skilled in the art from the following detailed description of preferred embodiments thereof taken in conjunction with the drawings, wherein:

FIG. 4 is a table containing optimum damping rates derived empirically as a function of frequently occurring input conditions in which damping performance is critical.

DETAILED DESCRIPTION OF THE PREFERRED EMBODIMENTS

Figure 1:
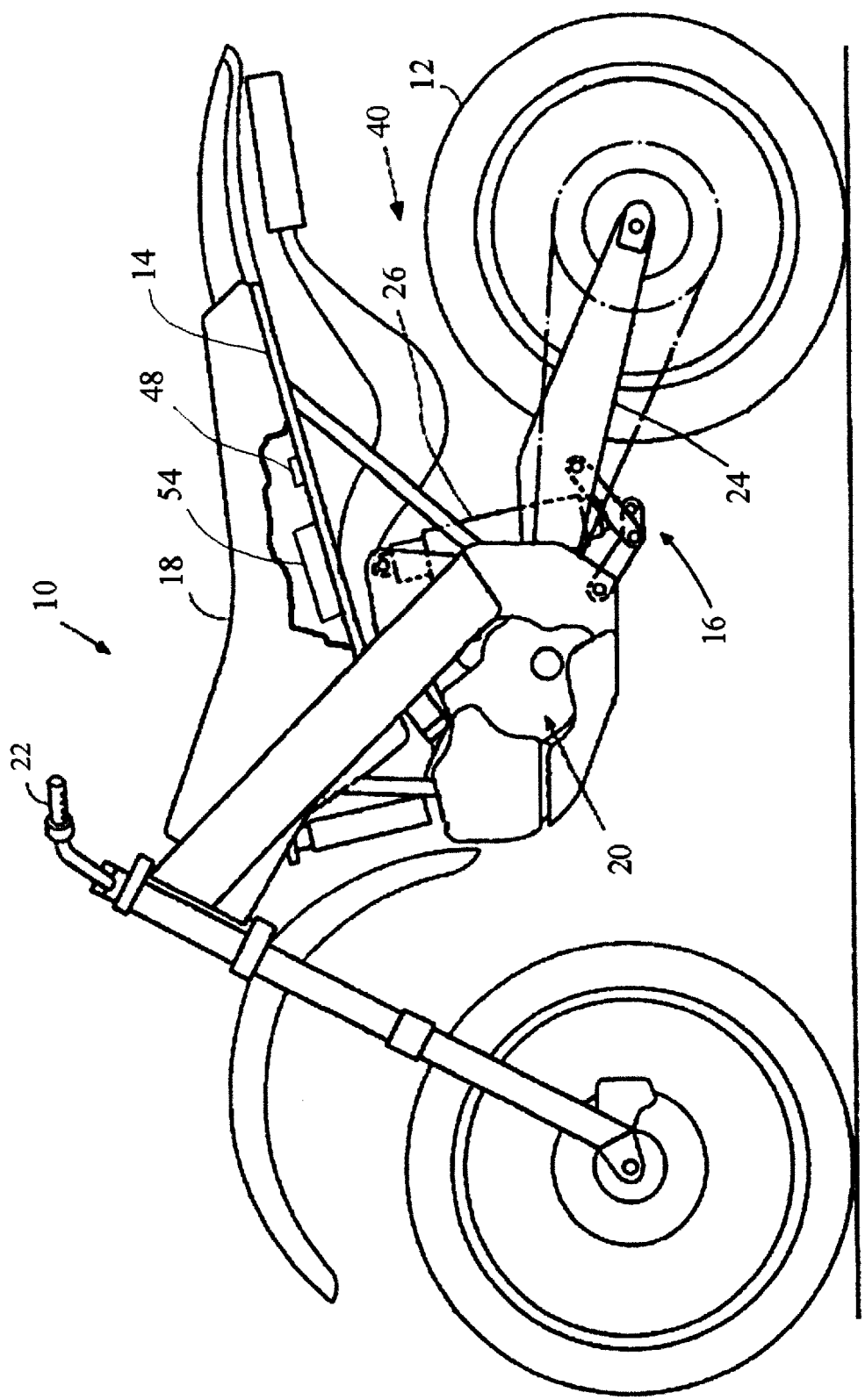
FIG. 1 is a side view of an all-terrain motorcycle.
Figure 2:
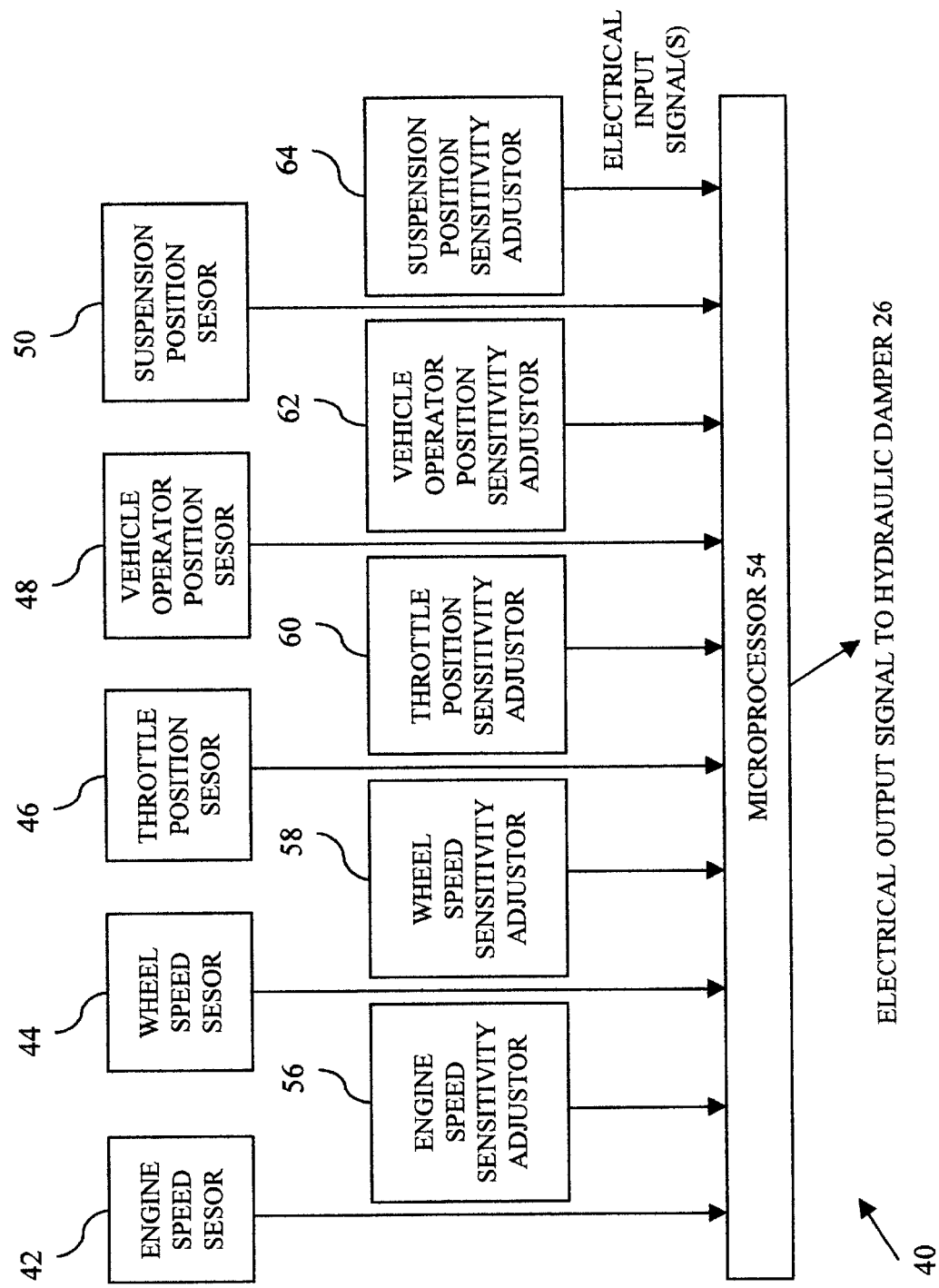
FIG. 2 is a schematic representation of a control system for a hydraulic damper on an all-terrain motor vehicle suspension system.
Figure 3:
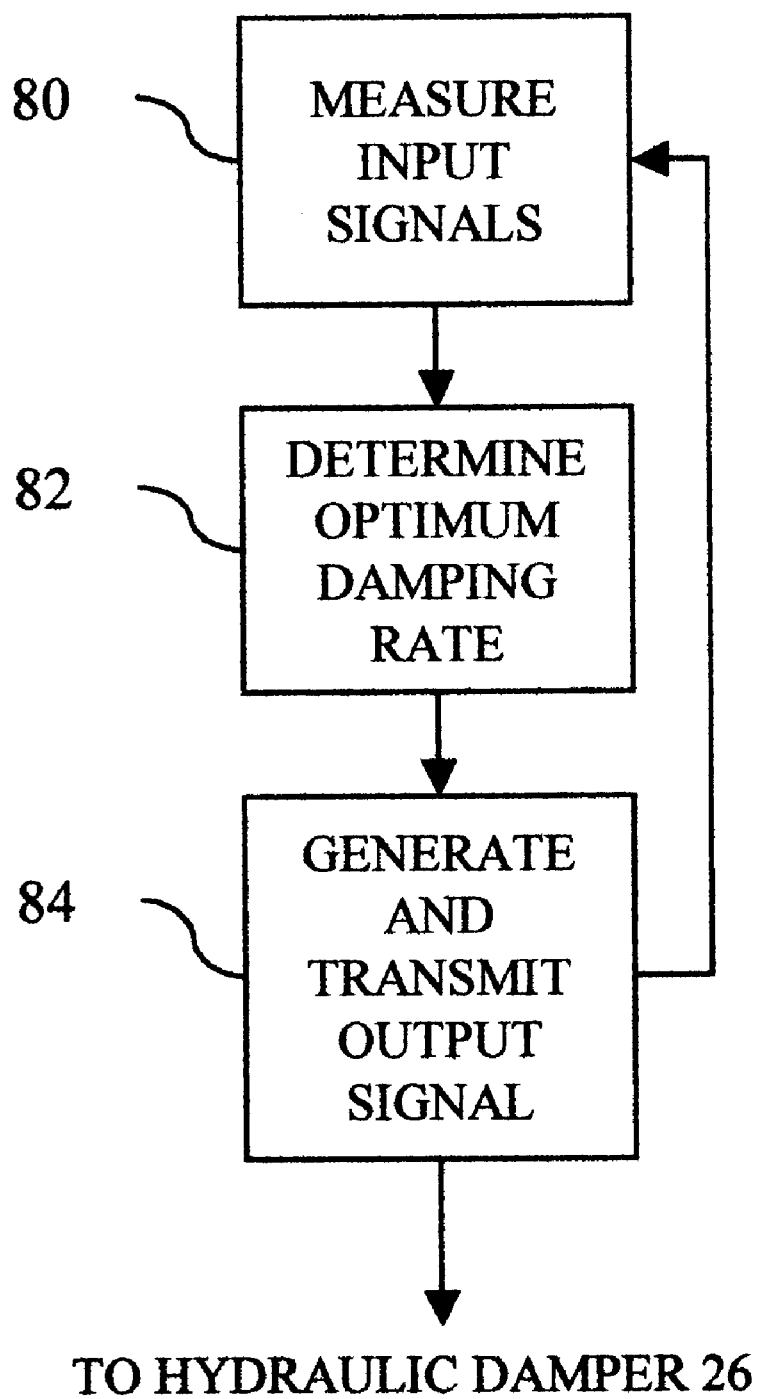
FIG. 3 is a schematic representation of a method for automatically controlling a hydraulic damper on an all-terrain motor vehicle suspension system.

The description of a control system for a hydraulic damper according to one embodiment of the present invention references FIG. 1, FIG. 2, and FIG. 3.

The preferred embodiment of control system 40 is broadly intended for integration into conventional all-terrain motorcycle 10, which broadly comprises wheel 12, frame 14, suspension system 16, seat 18, engine 20, and throttle 22.

Suspension system 16 further includes swing arm 24 and hydraulic damper 26.

Hydraulic damper 26 includes means for automatically controlling damping rates via electrical signal. Many different types of hydraulic dampers now exist having means for automatically controlling damping rates. One of ordinary skill in the art could easily make the modifications necessary to install such a damper into suspension system 16. Some have means to switch between a finite plurality of rates such as high and low. Others have means to set rates along a continuum between two extreme rates such as anywhere between and including high and low.

The preferred embodiment of control system 40 broadly comprises engine speed sensor 42 (not visible in FIG. 1), wheel speed sensor 44 (not visible in FIG. 1), throttle position sensor 46 (not visible in FIG. 1), vehicle operator position sensor 48, suspension position sensor 50 (not visible in FIG. 1), and microprocessor 54. All components are commonly commercially available and can be integrated into an existing vehicle without unreasonable modification.

Sensors 42, 44, 46, 48, and 50, and damper 26 are connected to microprocessor 54 to enable electrical signal communication with microprocessor 54.

Engine speed sensor 42 (not visible in FIG. 1) is an inductive proximity type such as a model PRX102-8N manufactured by Omega Engineering, Incorporated. Sensor 42 is rigidly mounted to the housing of engine 20 such that it can detect a raised portion of the flywheel (not visible in FIG. 1) of engine 20 as the raised portion comes into proximity to sensor 42 during flywheel rotation. It would also be obvious to one of ordinary skill in the art to configure sensor 42 to detect the actual teeth of the flywheel as the teeth move past sensor 42 during flywheel rotation. High-performance motor vehicles are now available in which engine speed is directly measured from the electrical circuit that drives spark plug ignition. It would be obvious to one skilled in the art to adapt such a system to measure the speed of engine 20. One could also use an inductive sensor having the sensing portion physically wrapped around a spark plug wire (not visible in FIG. 1) on engine 20. This type of sensor detects electrical ignition pulses sent through a spark plug wire on engine 20 and generates a corresponding pulsed electrical signal for input to microprocessor 54. The rate at which engine speed sensor 42 generates electrical pulses correlates to engine speed.

Wheel speed sensor 44 (not visible in FIG. 1) is an inductive proximity type such as a model PRX102-8N manufactured by Omega Engineering, Incorporated. Sensor 44 is rigidly attached to engine 20 such that it can detect the teeth of the output sprocket (not visible in FIG. 1) of engine 20 as they come into proximity to sensor 44 during sprocket rotation. It would also be obvious to one skilled in the art to integrate sensor 44 directly into the transmission housing (not visible in FIG. 1) of engine 20 such that sensor 44 can detect the teeth of a transmission gear (not visible in FIG. 1) as they come into proximity to sensor 44 during gear rotation.

Throttle position sensor 46 (not visible in FIG. 1) is a potentiometer such as a model 21176-1009 manufactured by Kawasaki that is integrated into the existing throttle system. Commercially available high-performance motor vehicles use such a device to in conjunction to an on-board computer to map engine ignition timing. One skilled in the art could configure sensor 46 to microprocessor 54 in a similar fashion such that throttle position could be measured.

Suspension position sensor 50 (not visible in FIG. 1) is a miniature mechanical switch such as those manufactured by the Micro Switch Division of Honeywell, Incorporated. A normally open or normally closed switch configuration may be used. Sensor 50 is rigidly attached to frame 14 such that swing arm 24 physically trips the switch when suspension system 16 reaches the fully extended position. One skilled in the art could also configure the mounting of sensor 50 such that any moving linkage (not visible in FIG. 1) of suspension system 16 contacts sensor 50 when suspension system 16 reaches the fully extended position. Frame 14 acts as a barrier against dirt and rocks, but must be shock proof, waterproof, and in general rugged enough to endure the harsh environments typically encountered by all-terrain vehicles. One skilled in the art could also employ an inductive proximity sensor that includes a sensor head portion and magnet portion. The magnet portion is integral to the piston inside hydraulic damper 26. The sensor head portion is rigidly attached to hydraulic damper 26 such that the magnet portion passes within close proximity of the sensor head portion every time hydraulic damper 26 reaches the fully extended position.

Vehicle operator position sensor 48 is a miniature mechanical switch such as those manufactured by the Micro Switch Division of Honeywell, Incorporated. A normally open or normally closed switch configuration may be used. Sensor 48 is rigidly attached between seat 18 and frame 14 such that the mass of the vehicle operator physically trips the switch when the vehicle operator is seated. Sensor 48 could also be made part of a foot peg (not visible in FIG. 1) of the vehicle such that the mass of the vehicle operator physically trips the switch when the vehicle operator is standing on the foot peg. A load cell such as model LCL-040 manufactured by Omega Engineering, Incorporated would allow microprocessor 54 to measure vehicle operator mass and to sense the condition where the vehicle operator is seated.

Microprocessor 54 is configured for input from sensors 42, 44, 46, 48, and 50, and output to hydraulic damper 26. Many commercially available alternatives for the actual embodiment of microprocessor 54 exist. One skilled in the art could employ a programmable logic controller or an imbedded application specific micro-controller, commonly known as an engine control module. Commonly available engine control modules specifically designed for high-performance racing can sense temperatures, wheel speed, throttle position, and engine speed. Manufacturers of these types of engine control modules could easily adapt an existing module for use in the system defined by this invention without undue experimentation. Microprocessor 54 includes engine speed sensitivity adjuster 56, wheel speed sensitivity adjuster 58, throttle position sensitivity adjuster 60, vehicle operator position sensitivity adjuster 62, and suspension position sensitivity adjuster 64. Microprocessor 54 may be centrally mounted on frame 14 and under seat 18 such that it will perform robustly when operating the vehicle in extreme conditions including exposure to rain, mud, dirt, rocks, vibration, and heat. The mounting position of microprocessor 54 also allows the vehicle operator easy access to sensitivity adjusters 56, 58, 60, 62, and 64 when seat 18 is removed. A computer used in conjunction with a communications cable (not shown) allows one skilled in the art to create, modify, and download software algorithms to microprocessor 54 per standard instructions included with microprocessor 54.

OPERATION OF THE PREFERRED EMBODIMENTS

The description of the operation of a control system for a hydraulic damper according to one embodiment of the present invention references FIG. 1, FIG. 2, FIG. 3, and FIG. 4.

While the vehicle is in operation, microprocessor 54 automatically executes and repeats a multiple step process. In step 80, microprocessor 54 measures the magnitudes of electrical input signals from sensors 42, 44, 46, 48, and 50, and sensitivity adjusters 56, 58, 60, 62, and 64. In step 82, microprocessor 54 determines an optimum damping rate by processing the measured electrical input signals through a software algorithm. In step 84, microprocessor 54 generates and transmits an electrical output signal corresponding to the optimum damping rate to hydraulic damper 26.

Engine speed sensor 42 (not visible in FIG. 1) generates an electrical signal for input to microprocessor 54 upon detecting a raised portion of the flywheel (not visible in FIG. 1) of engine 20 as it comes into proximity to sensor 42 during flywheel rotation. The rate at which sensor 42 (not visible in FIG. 1) detects the presence of the raised portion of the flywheel (not visible in FIG. 1) correlates to engine speed.

Wheel speed sensor 44 (not visible in FIG. 1) generates an electrical signal for input to microprocessor 54 upon detecting the presence of teeth on the output sprocket (not visible in FIG. 1) of engine 20 as they come into proximity to sensor 44 during sprocket rotation. The rate at which sensor 44 detects the presence of teeth correlates to wheel speed.

Throttle position sensor 46 (not visible in FIG. 1) generates a variable electrical resistance that is measured by microprocessor 54. This resistance correlates to throttle position and is relative to the throttle position corresponding to the condition in which the engine is idle.

Depending on switch configuration, suspension position sensor 50 (not visible in FIG. 1) either opens or closes the circuit made between suspension position sensor 50 and microprocessor 54 when suspension system 16 is in the fully extended position. Microprocessor 54 can be configured to interpret the open or closed circuit condition as the fully extended condition. An inductive proximity sensor will generate an electrical signal for input to microprocessor 54 when the sensor head portion and the magnet portion come into proximity when suspension system 16 reaches the fully extended position.

Depending on switch configuration, vehicle operator position sensor 48 either opens or closes the circuit made between vehicle operator position sensor 48 and microprocessor 54 when the vehicle operator is seated. Microprocessor 54 can be configured to interpret the open or closed circuit condition as the vehicle operator seated condition. A load cell would generate a voltage proportional to the load applied and can be correlated to vehicle operator weight and the condition where the vehicle operator is seated by microprocessor 54.

The algorithm through which the input signals are processed is empirically derived and is based on frequently occurring conditions in which damping performance is critical. The output of the algorithm switches between logical states corresponding to high or low damping rates depending on the combination of logical input states. Specifically, the logical output of the algorithm depends on measured magnitudes of electrical input signals generated by sensors 42, 44, 46, 48, and 50, and threshold magnitudes of sensitivity adjusters 56, 58, 60, 62, and 64. Sensitivity adjusters 56, 58, 60, 62, and 64 allow independent manual calibration of threshold magnitudes of the measured electrical input signals from sensors 42, 44, 46, 48, and 50, respectively, at which the algorithm switches between logical states for each measured input signal. For example, adjusting engine speed sensitivity adjuster 56 modifies the threshold magnitude of the measured electrical input signal from engine speed sensor 42 at which the algorithm switches between high and low engine speed logical states.

The algorithm also monitors elapsed time in which suspension position sensor 50 detects the condition where the suspension is in a fully extended position. Suspension position sensitivity adjuster 64 sets an elapsed time threshold magnitude. If the suspension stays in the fully extended position for an elapsed time exceeding the threshold magnitude, the algorithm overrides the combination of all other logical states and sets a logical output state corresponding to a high damping rate. Logical state 8 in FIG. 4 shows the described condition.

Thus, one will see that the invention provides a method and apparatus for advancing all-terrain motor vehicle damping system performance beyond that which any prior art provides.

Although the detailed description and operational description previously recited contain many specific details, these should not be construed as limitations on the scope of the invention, but rather as an exemplification of one preferred embodiment thereof. Many other variations are possible which can be readily adapted by those skilled in the art without undue experimentation. For example, there are many alternative yet common means for detecting the magnitude of damping performance variables. Many different types of sensors commonly available in addition to and equivalent to those specifically discussed include optoelectronic, capacitive proximity, strain gauges, linear scales, thermocouples, and thermistors.

The present invention can operate with input from a single variable or from a plurality of variables. For example, a drastic improvement in performance could be attained by sensing only a single variable such as the elapsed time the suspension is in a fully extended position.

Other variables that could appreciably effect damping performance not previously discussed or shown in the preferred embodiment could also be considered including hydraulic fluid temperature and hydraulic damper speed.

The flexibility inherent to the system defined by this invention allows different algorithms to accommodate different types of vehicles, specific riding conditions, or personal preference. Instead of using finite logical conditions as described by FIG. 4, the algorithm could be a continuous function and drive damping rates along a continuum between two damping rates. For example, instead of a complete override of conditions as described by logical state 8 of FIG. 4, the algorithm could increase damping rates commensurate with the elapsed time the suspension is in a fully extended position. In another example, the algorithm could avoid the condition known as bottoming where the damper reaches the fully retracted position. Upon detecting a bottoming condition during operation, the microprocessor could log the magnitude of all input signals immediately prior to the bottoming condition. If the system detects the same condition again, the compression damping rate could be increased by a predetermined percentage to avoid bottoming. With this functionality, an all-terrain motorcycle operator could traverse an entire racetrack and teach the terrain to the suspension system prior to a race to enhance suspension performance during the race.

The means by which the software algorithm is sensitive to the magnitude of input signals can be performed physically as described by this invention, or performed by the use of settings within the actual software algorithm itself This invention could be used on any or all wheels of an all-terrain vehicle having an independent suspension system.

For example, the invention could be applied for use on the rear wheel of a motorcycle, the front wheel, or both. The invention could be applied for use on the rear suspension of a quad, the front suspension, or both. The invention could be applied for use on all four wheels of a 4-wheel drive vehicle having a 4-wheel independent suspension system. The invention could be applied for use on the rear suspension of a snowmobile, the front suspension, or both.

Any combination of variations described above is also possible. Accordingly, the scope of the invention should be determined not by the embodiment(s) illustrated, but by the appended claims and their legal equivalents.

What is claimed is:

1. A control system for a hydraulic damper comprising:
    (a) first means for automatically sensing the magnitude of one or more electrical input signals;
    (b) second means for automatically processing each said input signal through a microprocessor software algorithm to determine an optimum damping rate; and
    (c) third means for automatically generating an electrical output signal corresponding to said optimum damping rate, said output signal is configured for communication with said hydraulic damper having means for automatically controlling the damping rate according to an electrical signal.

2. The system according to claim 1 wherein each said electrical input signal corresponds to a member of the group consisting of engine speed, wheel speed, throttle position, vehicle operator position, vehicle operator mass, and suspension position.

3. The system according to claim 1 further comprising a means for manually modifying the sensitivity of said algorithm to said magnitude of each said input signal.

4. A method for automatically controlling a hydraulic damper, comprising:
    (a) a first step of automatically sensing the magnitude of at least one electrical input signal;
    (b) a second step of automatically processing each said input signal through a microprocessor software algorithm to determine an optimmum damping rate; and
    (c) a third step of automatically generating an electrical output signal corresponding to said optimum damping rate, said output signal is configured for communication with said hydraulic damper having means for automatically controlling the damping rate according to an electrical signal.

5. The method according to claim 4 wherein each said electrical input signal corresponds to a member of the group consisting of engine speed, wheel speed, throttle position, vehicle operator position, vehicle operator mass, and suspension position.

* * * * *